Dec. 26, 1950

E. S. WARNER

THREE-PHASE TRANSFORMER CONNECTION AND PHASE-ANGLE INDICATOR 2,535,767

Filed Jan. 17, 1949

4 Sheets-Sheet 1

INVENTOR.

Elmer S. Warner

Dec. 26, 1950

E. S. WARNER

THREE-PHASE TRANSFORMER CONNECTION AND PHASE-ANGLE INDICATOR 2,535,767

Filed Jan. 17, 1949

4 Sheets-Sheet 2

*INVENTOR.*

Elmer S. Warner

INVENTOR.
Elmer S. Warner

Dec. 26, 1950 E. S. WARNER 2,535,767

THREE-PHASE TRANSFORMER CONNECTION AND PHASE-ANGLE INDICATOR

Filed Jan. 17, 1949 4 Sheets-Sheet 4

INVENTOR.

Elmer S. Warner

Patented Dec. 26, 1950

2,535,767

UNITED STATES PATENT OFFICE 2,535,767

THREE-PHASE TRANSFORMER CONNECTION AND PHASE-ANGLE INDICATOR

Elmer Sauter Warner, Schaumburg Township, Cook County, Ill.

Application January 17, 1949, Serial No. 71,330

7 Claims. (Cl. 235—88)

My invention relates to and has for its purpose the provision of an extremely simple and inexpensive device which can be easily manipulated to indicate the unknown of three interrelated quantities i. e. connections of the primary, connections of the secondary, and the phase-angle of transformers in three-phase service.

Heretofore considerable skill and knowledge of vectors were required to determine transformer connections for three-phase service but by means of my indicator the connections or phase-angle may be determined with facility and dispatch.

In the accompanying drawings similar numerals refer to similar parts through the several figures.

Figure 3:
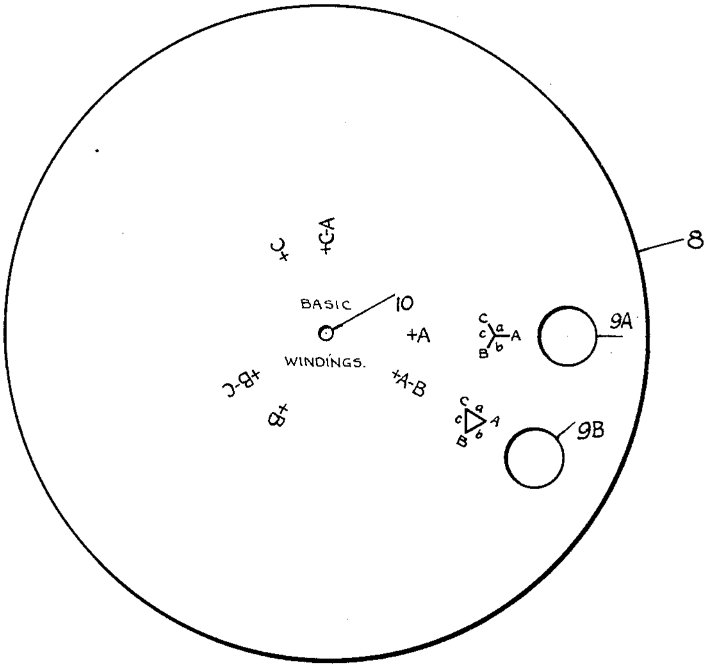
Fig. 3 is the top view of disc 8.

Details of construction shown on drawings:

1 is an opaque disc (to be placed on top of disc 8 of Fig. 3).

Figure 1:
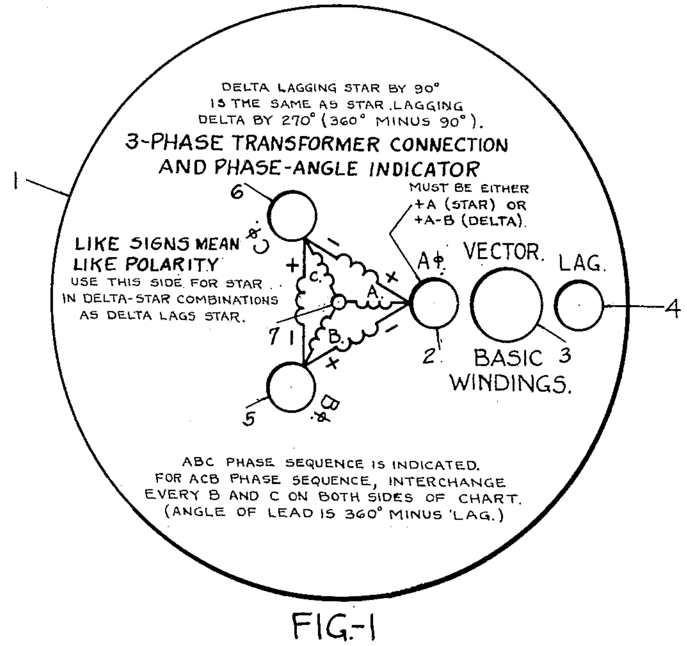
Fig. 1 is the top view of disc 1.
Figure 2:
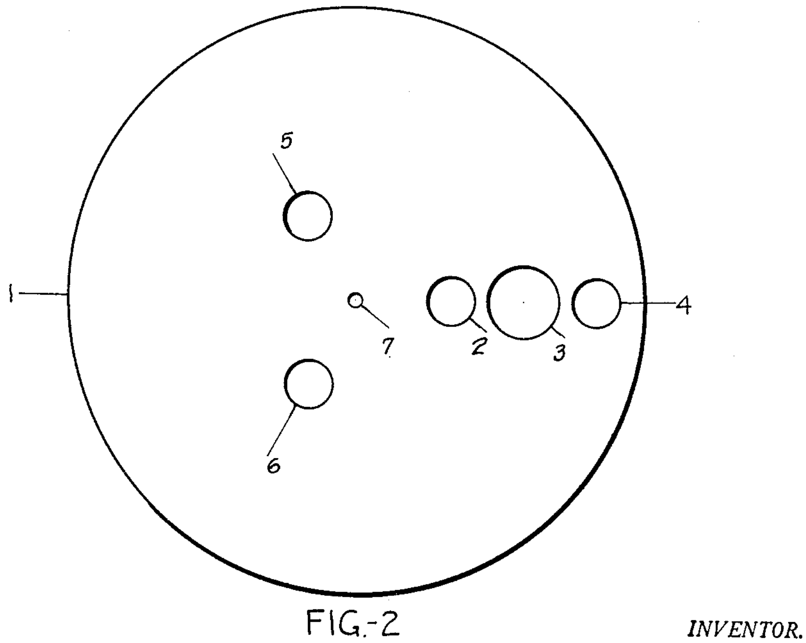
Fig. 2 is the bottom view of disc 1.

2 is a window in disc 1 designated "Aϕ" in Fig. 1 thru which disc 8 of Fig. 3 is viewed.

3 is a window in disc 1 designated "Vector" in Fig. 1 thru which disc 8 of Fig. 3 is viewed.

Figure 5:
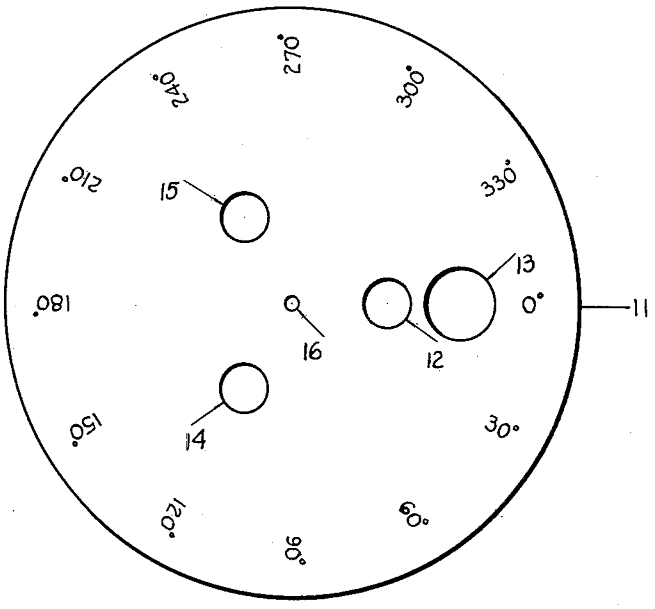
Fig. 5 is the top view of disc 11.

4 is a window in disc 1 designated "Lag" in Fig. 1 thru which disc 11 of Fig. 5 is viewed via window 9A or 9B of disc 8 in Fig. 3.

5 is a window in disc 1 designated "Bϕ" in Fig. 1 thru which disc 8 of Fig. 3 is viewed.

6 is a window in disc 1 designated "Cϕ" in Fig. 1 thru which disc 8 of Fig. 3 is viewed.

7 is a hole in disc 1 for fastening together discs 1, 8, and 11.

8 is an opaque disc (to be placed between disc 1 of Fig. 1 and disc 11 of Fig. 5).

9A is one of two windows in disc 8 thru which disc 11 of Fig. 5 may be viewed from window 4 of disc 1, Fig. 1.

9B is the second of two windows (30 degrees apart) in disc 8 thru which disc 11 of Fig. 5 may be viewed from window 4 of disc 1, Fig. 1.

10 is a hole in disc 8 for fastening together discs 1, 8 and 11.

11 is an opaque disc (to be placed under disc 8 of Fig. 3).

Figure 4:
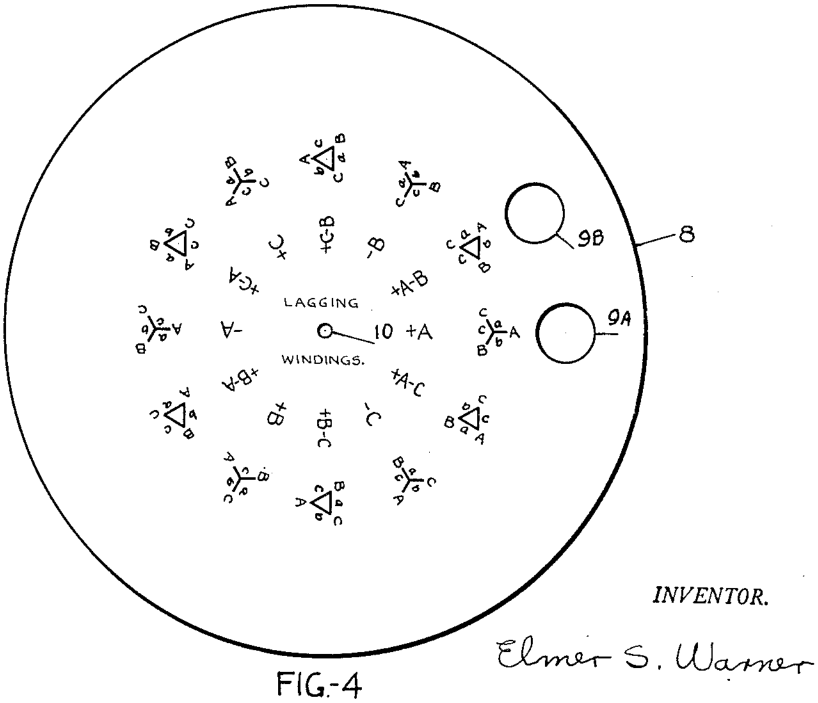
Fig. 4 is the bottom view of disc 8.
Figure 6:
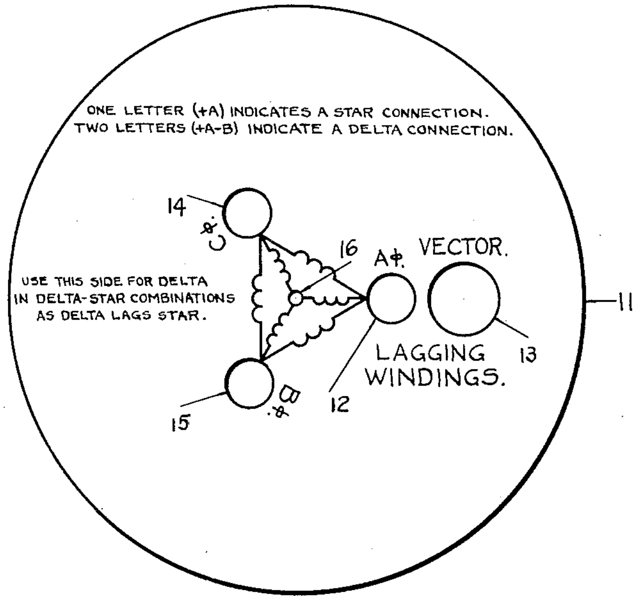
Fig. 6 is the bottom view of disc 11.

12 is a window in disc 11 designated "Aϕ" in Fig. 6 thru which disc 8 of Fig. 4 is viewed.

13 is a window in disc 11 designated "Vector" in Fig. 6 thru which disc 8 of Fig. 4 is viewed.

14 is a window in disc 11 designated "Cϕ" in Fig. 6 thru which disc 8 of Fig. 4 is viewed.

15 is a window in disc 11 designated "Bϕ" in Fig. 6 thru which disc 8 of Fig. 4 is viewed.

16 is a hole in disc 11 for fastening together discs 1, 8 and 11.

The indicator was devised by laying-out a diagram of a star connection and providing windows at the points of the star thru which is indicated the phase and polarity of the terminals of the star. Superimposed on the star diagram was a delta diagram whose terminals coincided with those of the star. Thus the letters in the windows would indicate the star of delta terminals depending on what was dialed. A star terminal is indicated by the appearance of one letter such as +A in the window, whereas the delta terminal is indicated by the appearance of two letters such as +A—B which means that the polarized side of the A-phase coil is joined with the unpolarized side of the B-phase coil. Like signs indicate like polarity of both windings of the transformer. The three windows on the delta-star are designated A-phase, B-phase, and C-phase and indicate the phase of the terminals. The window designated "Lag" indicates the phase-angle or the angle the connection or vector dialed on the "Lagging windings" side of the indicator lags the connection or vector dialed on the "Basic windings" side. The side of the indicator marked "Basic windings" is used for only the leading windings: the opposite side marked "Lagging windings" is used for only the lagging windings.

Figure 7:
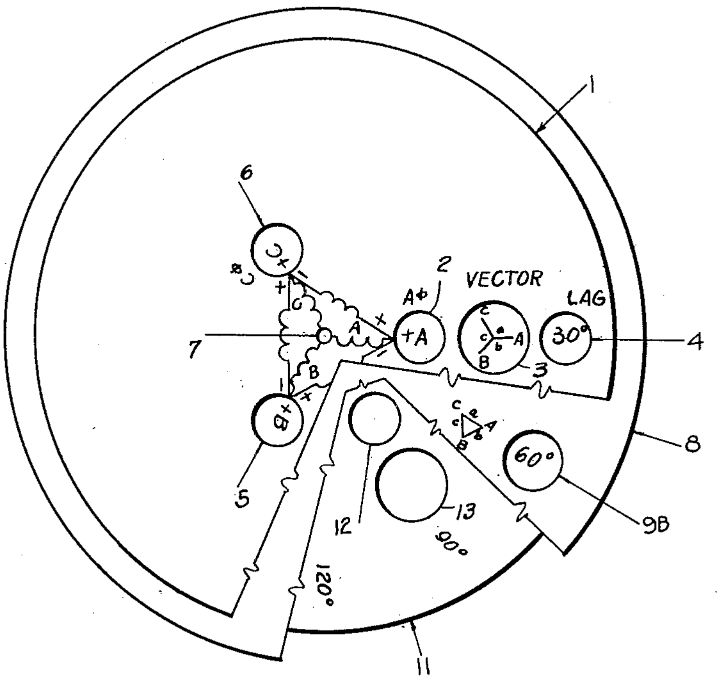
Fig. 7 is the top view of the assembly of discs 1, 8, and 11 with part cut away to expose the parts which are normally concealed, and set for problem 1.
Figure 8:
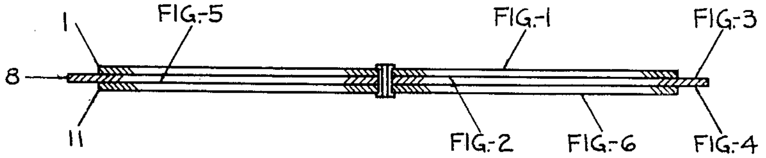
Fig. 8 is a section of the assembly of discs 1, 8, and 11 showing the method of fastening the discs together at their center with a hollow rivet.
Figure 9:
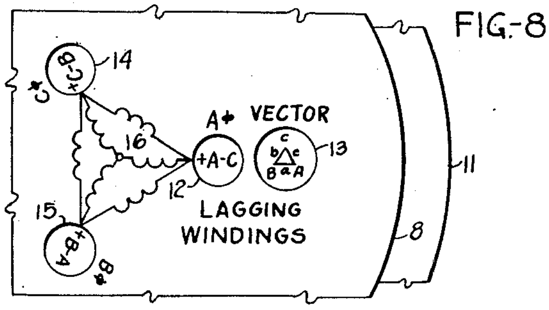
Fig. 9 is the bottom view of the assembly of discs 1, 8, and 11 set for problem 1.

The following is a specific example of a problem solved with the indicator of this invention:

*Problem 1.*—Determine the phase-angle if the connections or vectors of a delta-star transformer are given as indicated in Figures 7 and 9.

*Solution.*—Referring to Fig. 7, rotate disc 8 until the given connection or vector for the star appears in window 3. +A appears in window 2 for the A-phase terminal, +B appears in window 5 for the B-phase terminal, and +C appears in window 6 for the C-phase terminal. If the + sign is the polarized side of the basic windings (it may be the unpolarized side if so chosen) then the + sign on the lagging windings is the polarized side. That is, like signs indicate like polarities on both basic and lagging windings. The indicator is then turned over so that the bottom side (Fig. 6) of disc 11 is up (see Fig. 9). Disc 11 is then rotated until the given connection or vector for the delta appears in window 13. +A—C appears in window 12 for the A-phase terminal. This means that the polarized side of the A-phase winding is joined with the unpolarized side of the C-phase winding to form the A-phase terminal of the delta. +B—A appears in window 15 for the B-phase terminal of the delta. This means that the polarized side of the B-phase winding is joined with the unpolarized side of the A-phase winding to form the B-phase terminal of the delta. +C—B appears in window 14 for the C-phase terminal. This means that the polarized side of the C-phase winding is joined with the unpolarized side of the B-phase winding to form the C-phase terminal of the delta. The indicator is then turned over (see Fig. 7) so that the top side Fig. 1 of disc 1 is up. 30 degrees appears in window 4. This means that the delta lags the star by 30 degrees.

The problems consist of determining the unknown of three interrelated quantities, two being known. The three quantities are the connection or vector of the basic windings, the connection or vector of the lagging windings, and the phase-angle or angle the lagging windings lag the basic windings. Any one of the three may be found directly by the use of the indicator if the other two are known.

While I have illustrated and described what I regard to be the preferred embodiment of my invention, nevertheless it will be understood that such is merely exemplary, and that numerous modifications and rearrangements may be made therein without departing from the essence of the invention.

I claim:

1. An indicator of the character described comprising means for designating the series of phase terminals of transformers, means for illustrating transformer circuits diagrammatically, means for illustrating different methods of transformer phase connections diagrammatically, and a means for associating the several means with each other whereby any desired transformer circuit can be brought into registering relation to any series of phase terminals and any method of phase connection can be brought into registering relation to any transformer circuit and the phase-angle between the primary and secondary indicated.

2. An indicator of the character described comprising a rotatable opaque element having on the obverse side a series of symbols designating transformer primary connections and five windows, and upon the reverse side just five windows, a second rotatable opaque element having upon each side a series of phase designations, vector symbols, and two windows, a third rotatable opaque element having upon the obverse side a series of phase-angles with four windows and upon the reverse side a series of symbols designating transformer secondary connections and four windows, and means for associating the three elements to permit independent rotation of each and in a manner to allow any desired transformer primary connection designation to be brought into registering relation to any series of primary phase designations, and any desired transformer secondary connection designation to be brought into registering relation to any series of secondary phase designations thereby indicating the phase-angle between primary and secondary.

3. An indicator as embodied in claim 2 wherein the three elements are in the form of opaque discs the first and third of which are of the same diameter and the second of a larger diameter, and mounted for rotation about a common axis.

4. An indicator of the character described comprising a plurality of relatively movable members the first of said members having inscribed on the obverse side a plurality of different sets of diagrams designating a corresponding number of different transformer primary connections, a second of said members having inscribed on the obverse side a plurality of different sets of primary phase designations and vector symbols equal in number to the sets of transformer primary connections, a third of said members having inscribed on the reverse side a plurality of different sets of diagrams designating a corresponding number of different transformer secondary connections, the second of said members having inscribed on the reverse side a plurality of different sets of secondary phase designations and vector symbols greater in number than the sets of the transformer secondary connections, the third of said members having inscribed on the observe side a plurality of phase-angles greater in number than the sets of the transformer primary connections, said members being adapted to be moved into a plurality of positions to bring any one set of transformer primary connections into registry with any one set of primary phase designations, and any one of the transformer secondary connections into registry with any one of the sets of secondary phase designations whereby the proper phase-angle is indicated for the particular connection used.

5. An indicator of the class described comprising a plurality of relatively movable members, certain of said members having inscribed on the same inter-related portions of various types of transformer primary connections, the secondary connections of one of the said members being adapted to be moved into registry with the primary connections of the other of said members to indicate the connections necessary for a particular phase-angle.

6. An indicator of the class described comprising a plurality of relatively movable members, the first of said members having inscribed on the same inter-related portions of various types of transformer primary connections, the primary phase connection portion of the second of said members being adapted to be moved into registry with the transformer primary connection portion of the first of said members to indicate the proper primary connections necessary to partially complete each particular transformer connection, and transformer secondary connection portions on the reverse side of the third of said members, the secondary phase connection portion of the second of said members being adapted to be moved into registry with the transformer secondary connection portion of the third of said members to indicate the proper secondary connections necessary to complete each particular transformer connection together with the proper phase-angle indicated.

7. An indicator of the class described comprising a plurality of relatively movable members arranged in a superimposed position and in a manner to expose portions of the same complementary to each other, the first of said members having inscribed on the exposed portions thereof inter-related portions of various types of transformer primary connections, the primary phase designation portions of the second of said members being adapted to be moved into registry with the primary connection portion of the first of said members to indicate the proper phase designations necessary to partially complete each particular connection, and the third of said members having inscribed on the exposed portions thereof inter-related portions of various types of transformer secondary connections, the secondary phase designation portions of the second of said members being adapted to be moved into registry with the secondary connection portion of the third of said members to designate the phase-angle and the terminals of each winding necessary to be connected in practice to complete a selected transformer connection for three-phase service.

ELMER SAUTER WARNER.

REFERENCES CITED

The following references are of record in the file of this patent:

UNITED STATES PATENTS

| Number | Name | Date |
| --- | --- | --- |
| 1,186,146 | Sutherland et al. | June 6, 1916 |
| 1,545,921 | Paul | July 14, 1925 |
| 1,675,019 | Beaver | June 26, 1928 |